United States Patent
Niver (10) Patent No.: US 8,312,897 B2
(45) Date of Patent: Nov. 20, 2012

(54) DIVERTER VALVE

(75) Inventor: Michael A. Niver, Plymouth, WI (US)

(73) Assignee: Kohler Co., Kohler, WI (US)

( * ) Notice: Subject to any disclaimer, the term of this patent is extended or adjusted under 35 U.S.C. 154(b) by 460 days.

(21) Appl. No.: 12/335,564

(22) Filed: Dec. 16, 2008

(65) Prior Publication Data

US 2010/0147405 A1 Jun. 17, 2010

(51) Int. Cl.
- *F16K 11/16* (2006.01)
- *F16K 11/07* (2006.01)
- *F16K 1/42* (2006.01)

(52) U.S. Cl. ......... 137/630.16; 137/119.05; 137/625.42; 137/625.48; 251/363

(58) Field of Classification Search ............. 137/625.48, 137/630.16, 625.42, 597, 119.04, 119.05; 251/363

See application file for complete search history.

(56) References Cited

U.S. PATENT DOCUMENTS

| | | | |
|---|---|---|---|
| 1,532,433 A | 4/1925 | Mueller | |
| 1,616,672 A * | 2/1927 | Wilson | 251/333 |
| 1,666,531 A | 4/1928 | Glauber | |
| 1,903,757 A | 4/1933 | Florido | |
| 2,045,308 A * | 6/1936 | Wolff | 137/630.16 |
| 2,519,158 A * | 8/1950 | Symmons | 137/597 |
| 2,673,572 A | 3/1954 | Hartmann et al. | |
| 2,956,579 A * | 10/1960 | Moore et al. | 137/218 |
| 3,601,141 A | 8/1971 | Kishu | |
| 3,841,346 A | 10/1974 | Amblank | |
| 4,095,610 A | 6/1978 | Priesmeyer | |
| 4,503,877 A * | 3/1985 | Ward et al. | 137/119.03 |
| 4,675,924 A | 6/1987 | Allison et al. | |
| 5,065,982 A | 11/1991 | Shih | |
| 5,402,822 A | 4/1995 | Brouwer et al. | |
| 6,035,458 A * | 3/2000 | Tarzia | 4/443 |
| 6,182,700 B1 * | 2/2001 | Hannemann et al. | 137/881 |
| 6,279,610 B1 * | 8/2001 | Fan | 137/625.48 |
| 6,973,937 B1 | 12/2005 | Yang | |
| 7,090,144 B2 * | 8/2006 | Gross et al. | 239/26 |
| 7,380,731 B1 * | 6/2008 | Hsu | 239/447 |
| 2008/0067264 A1 | 3/2008 | Erickson et al. | |

FOREIGN PATENT DOCUMENTS

| | | |
|---|---|---|
| DE | 29610340 | 10/1996 |
| DE | 102004018073 | 10/2005 |
| GB | 1393330 | 5/1975 |
| GB | 2050579 | 1/1981 |
| WO | WO 01/90615 | 11/2001 |

OTHER PUBLICATIONS 6 pages of a PCT report dated Mar. 10, 2010 in a corresponding application PCT/US2009/006182.

* cited by examiner

*Primary Examiner* — Craig Schneider
*Assistant Examiner* — Atif Chaudry
(74) *Attorney, Agent, or Firm* — Foley & Lardner LLP (57) ABSTRACT

A diverter valve is disclosed for use in a shower mixer valve or the like. It is constructed to reduce the force needed to be applied by the bather to actuate the diversion. There is a diverter stem that is moveable between a non-diverted and diverted position. The diverter stem includes an upstream portion and a reduced cross sectional waist portion downstream of the upstream portion. The reduced portion interacts with the diverted fluid to reduce the force required to move the diverter stem from the non-diverted to the diverted position.

20 Claims, 6 Drawing Sheets

DIVERTER VALVE

CROSS-REFERENCE TO RELATED APPLICATION

Not applicable

STATEMENT OF FEDERALLY SPONSORED RESEARCH OR DEVELOPMENT

Not applicable

BACKGROUND OF THE INVENTION

The present invention relates to fluid control valves which can divert flow between/among multiple outlet fittings. More particularly it relates to structures used therewith which reduce the needed diverter activation force.

Most bath tub/shower combinations have a tub filler spout positioned about two feet above the tub floor, and a separate showerhead positioned about six feet above the tub floor. A single mixing valve controls the temperature and rate of flow of the water for both. There is often a diverter unit positioned directly on the tub filler spout. All flow from the control valve will normally go to the filler spout (and thus the tub). However, when the diverter is activated essentially all flow will be directed up to the showerhead.

While this type of filler mounted diverter assembly serves the basic functional needs, it disrupts the aesthetics of the tub filler somewhat. Further, diverters of this type can accidentally snag nearby items.

Hence, there have been attempts to position the diverter as part of a mixing valve positioned on a room wall. See e.g. U.S. Pat. No. 4,095,610. In such assemblies the bather can first adjust the temperature and volume by starting flow through the mixer and sampling the water exiting the tub filler. Once the desired temperature and volume are reached, the tub drain can be closed to fill the tub, or alternatively the diverter unit portion of the mixer can be activated to send the water to the showerhead.

However, current diverters used with this type of shower mixer can require a significant amount of force to actuate the diverter. For arthritic or otherwise disabled persons even this can be painful or difficult.

U.S. Pat. No. 1,666,531 teaches a diverter that is maintained in the shower diversion setting by water pressure, such that when the water is turned off the diverter automatically returns the water flow path to the tub filler. However, when in the resting tub filler position, the diverter is biased to stay in that position by both an internal spring force and water pressure. Thus, both increasing spring force and water pressure must be overcome to move the diverter from the tub filler position toward the shower outlet position.

U.S. Pat. Nos. 3,841,346 and 4,675,924 disclose diverters that are maintained in one position by water pressure. However, the user is required to overcome a significant amount of spring force to manipulate the diverter.

In any event, in certain jurisdictions (e.g. those governed by the Americans with Disabilities Act), a series of guidelines and regulations have been (and are likely to be) developed placing upper limits on the amount of force a user of a facility can be required to impart in order to use that facility. Architects and building owners are therefore becoming increasingly reluctant to specify products which present this type of problem.

Thus, a need exists for diverters, particularly diverters used with shower mixers of this type, that can be operated with less actuation force.

SUMMARY OF THE INVENTION

In one aspect the present invention provides a diverter valve. There is a housing having an internal chamber, a supply port in fluid communication with the internal chamber and coupleable to a fluid supply, a first outlet, a second outlet, and a stem moveable within the chamber between a first position at which the stem permits fluid communication between the supply port and the first outlet while inhibiting fluid communication between the supply port and the second outlet, and a second position at which the stem permits fluid communication between the supply port and the second outlet while inhibiting fluid communication between the supply port and the first outlet.

The stem includes a downstream portion that has a reduced cross sectional area relative to an upstream portion of the stem. The stem is configured and positioned such that the reduced cross sectional area helps reduce the activation force needed to move the stem from the first position to the second position.

In preferred forms the housing also houses a mixing valve suitable to control both temperature and volume, the stem tapers radially inwardly from the upstream portion to the downstream portion, the stem also flares radially outwardly downstream of the downstream portion, and the upstream portion is essentially cylindrical. In other forms the stem is linked to a seal coupled to the upstream portion, there is a biasing member (e.g. a spring) urging the stem towards the first position, and a stop member is provided to help capture the compression spring.

In another aspect the invention provides a diverter valve coupleable to a fluid supply to selectively direct a fluid between two outlets. The valve has a cylindrical chamber, a supply port in fluid communication with the chamber and coupleable to the fluid supply, a first outlet, a second outlet, and a generally cylindrical diverter stem moveable within the chamber between a non-diverted position at which the diverter stem inhibits fluid communication between the supply port and the second outlet, and a diverted position at which the diverter stem permits fluid communication between the supply port and the second outlet.

The diverter stem has an upstream portion, a downstream portion, and a reduced cross sectional waist between the upstream and downstream portions. The waist tapers radially inwardly from the upstream portion and flares radially outwardly towards the downstream portion. Thus, the diverter stem is configured and positioned such that the reduced cross sectional area helps reduce the activation force needed to move the stem from the first position to the second position.

It will be appreciated that these embodiments provide a diverter valve requiring a reduced activation force to move the diverter from the non-diverted to the diverted position. This is achieved at low cost and in a reliable manner. This not only helps comply with governmental regulations, it provides the device with a usage feel that gives the impression of a well constructed device.

These and still other advantages of the present invention will be apparent from the detailed description and drawings. What follows is merely a preferred embodiment of the present invention. To assess the full scope of the invention the claims should be looked to.

BRIEF DESCRIPTION OF THE DRAWINGS

FIG. 2 is a left, frontal, upper perspective view of a housing portion thereof, with diverter valve components shown exploded there from;

DETAILED DESCRIPTION OF THE PREFERRED EMBODIMENTS

Figure 1:
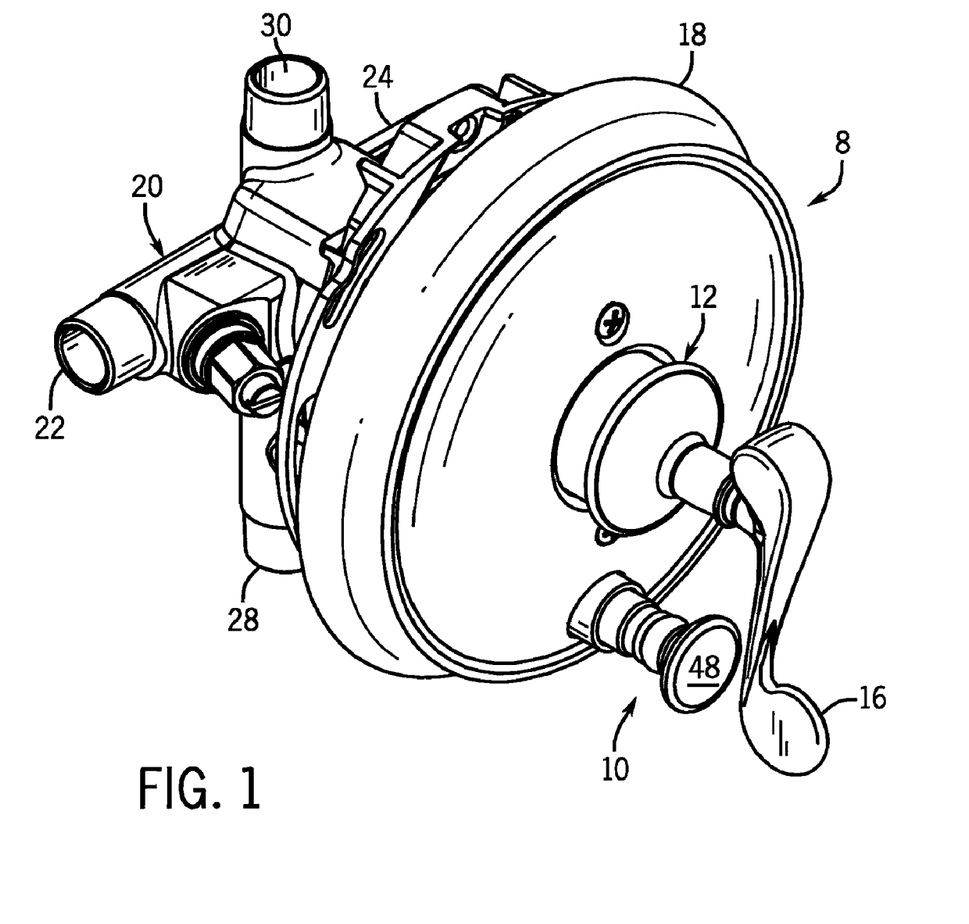
FIG. 1 is a left, frontal, upper perspective view of a shower mixer that incorporates a diverter valve of the present invention.

FIG. 1 shows a shower mixer generally 8 having a diverter valve 10, a mixing valve 12, a handle 16 for rotating the control components of the mixing valve, and a decorative escutcheon 18. The mixing valve 12 is received in a mixing cavity 26 of the main housing 20. That housing receives a hot water supply into conduit 22 and a cold water supply into conduit 24.

Figure 6:
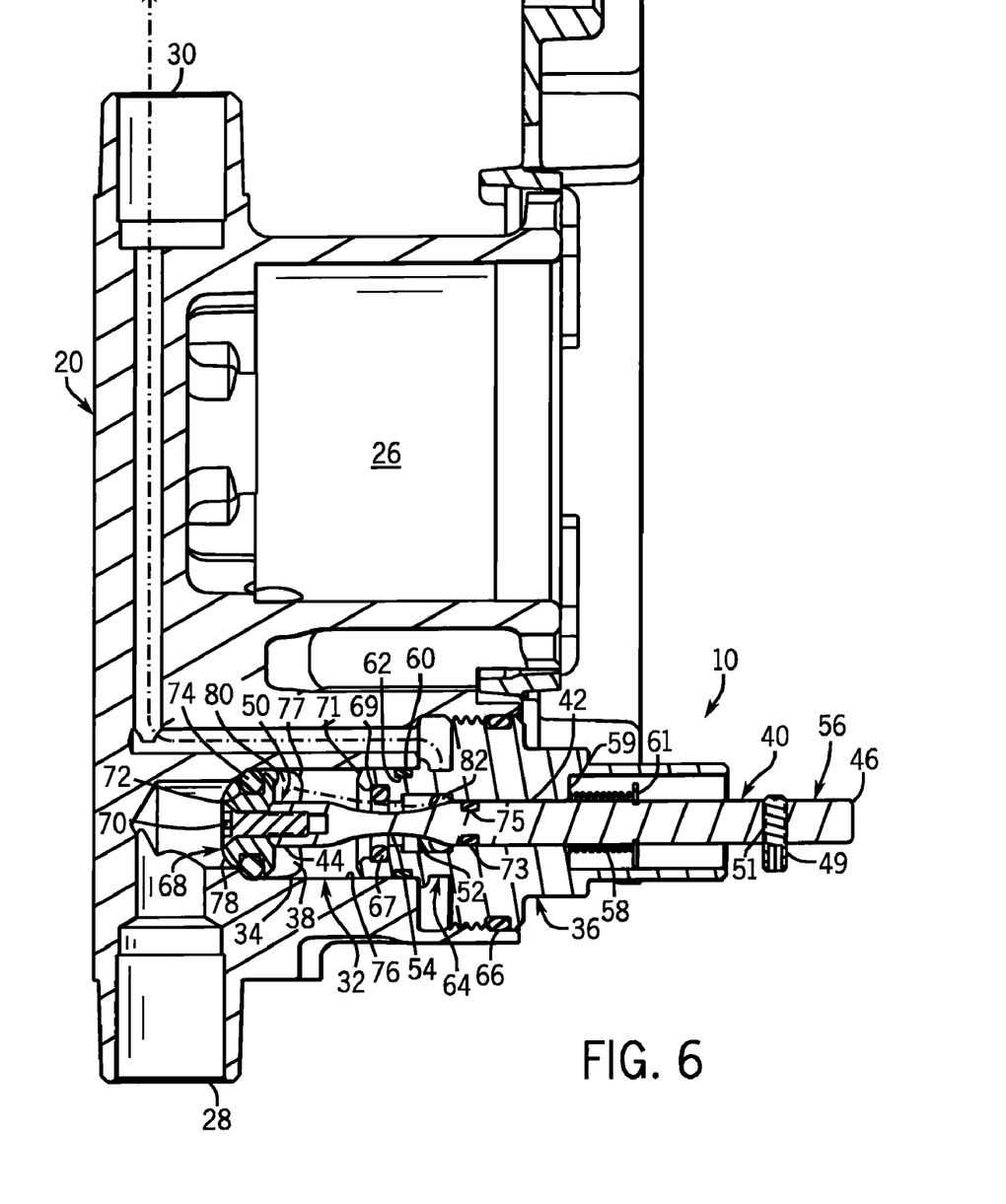
FIG. 6 is a view similar to FIG. 4, but with the diverter valve shown in the fully diverted position.

Water leaving the housing 20 either leaves via outlet 28 (per FIG. 4) or outlet 30 (per FIG. 6). The mixing valve 12 is preferably of a conventional type where rotating the handle 16 controls both temperature and volume (e.g. increasing rotation starts a cold volume, which then increases to a maximum cold volume, which then blends to create a hotter flow).

The specific type of mixing valve is not critical. Further, the mixer need not be for use with a tub/shower combination. Instead, it could control flow between a main faucet and a spray head, or between a main faucet and a pot filler.

Mixing cavity 26 is in fluid communication with a chamber 32 defined by a recess 34, and the main housing 36 of the diverter valve is threadably engaged with the recess 34 to install it in place. The water in the mixing cavity 26 flows under line pressure through a supply port 38. The subsequent path of the water is determined by the position of a diverter stem 40.

Figure 4:
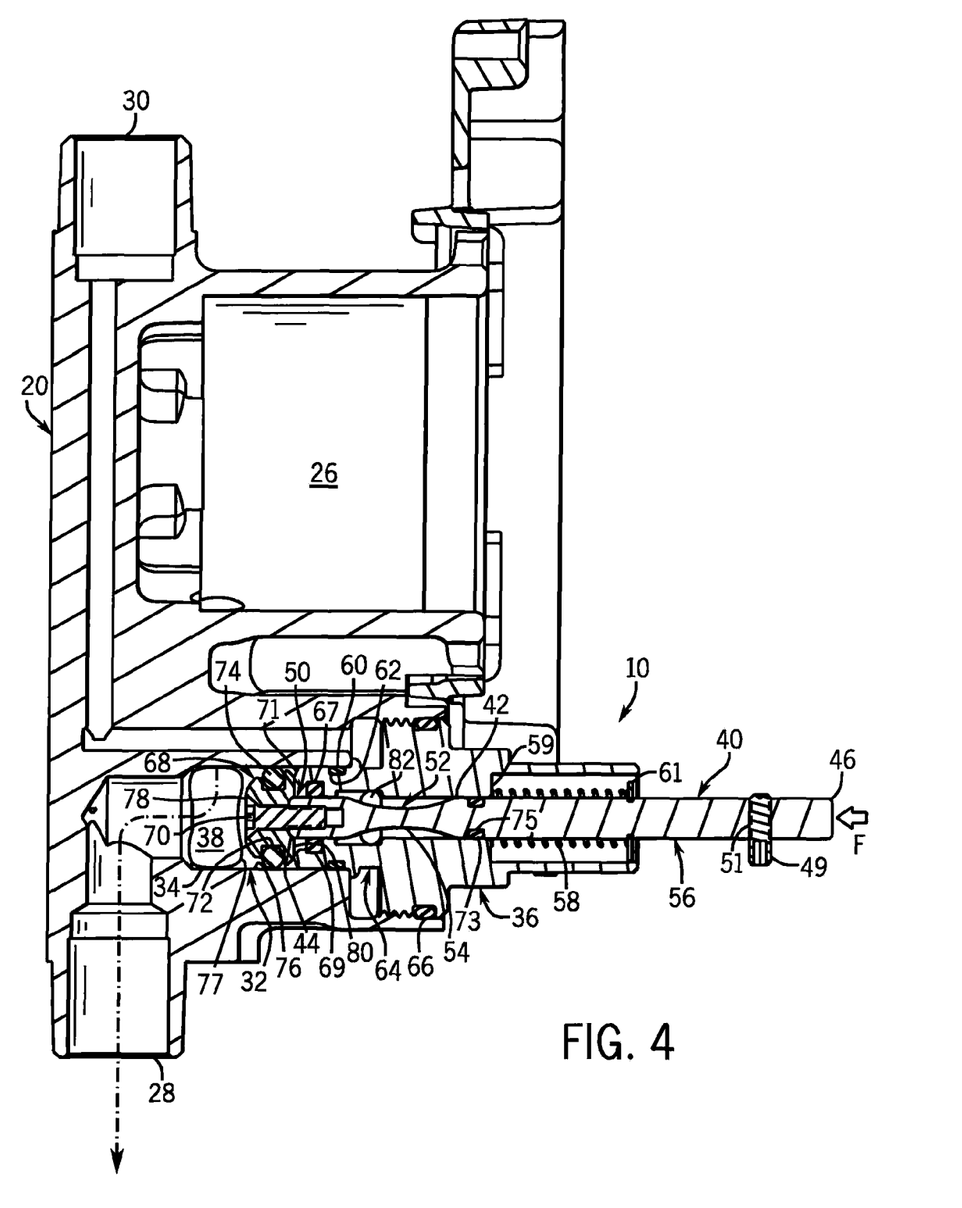
FIG. 4 is a cross sectional view along line 4-4 of FIG. 3, showing the diverter valve in a non-diverted (tub filler directed) position.

As best seen in FIG. 4, there is an axial passageway 42 formed in the diverter body 36 which slideably receives the diverter stem 40. As also can be appreciated from FIG. 2, the diverter stem 40 includes an upstream end 44 proximate the supply port 38 (when assembled), and a downstream end 46 that extends beyond the diverter body 36 to link with control knob 48, which in turn can be secured via set screw 49 threadably engaging a transverse hole 51 in the diverter stem 40 and also part of the knob 48.

Figure 2:
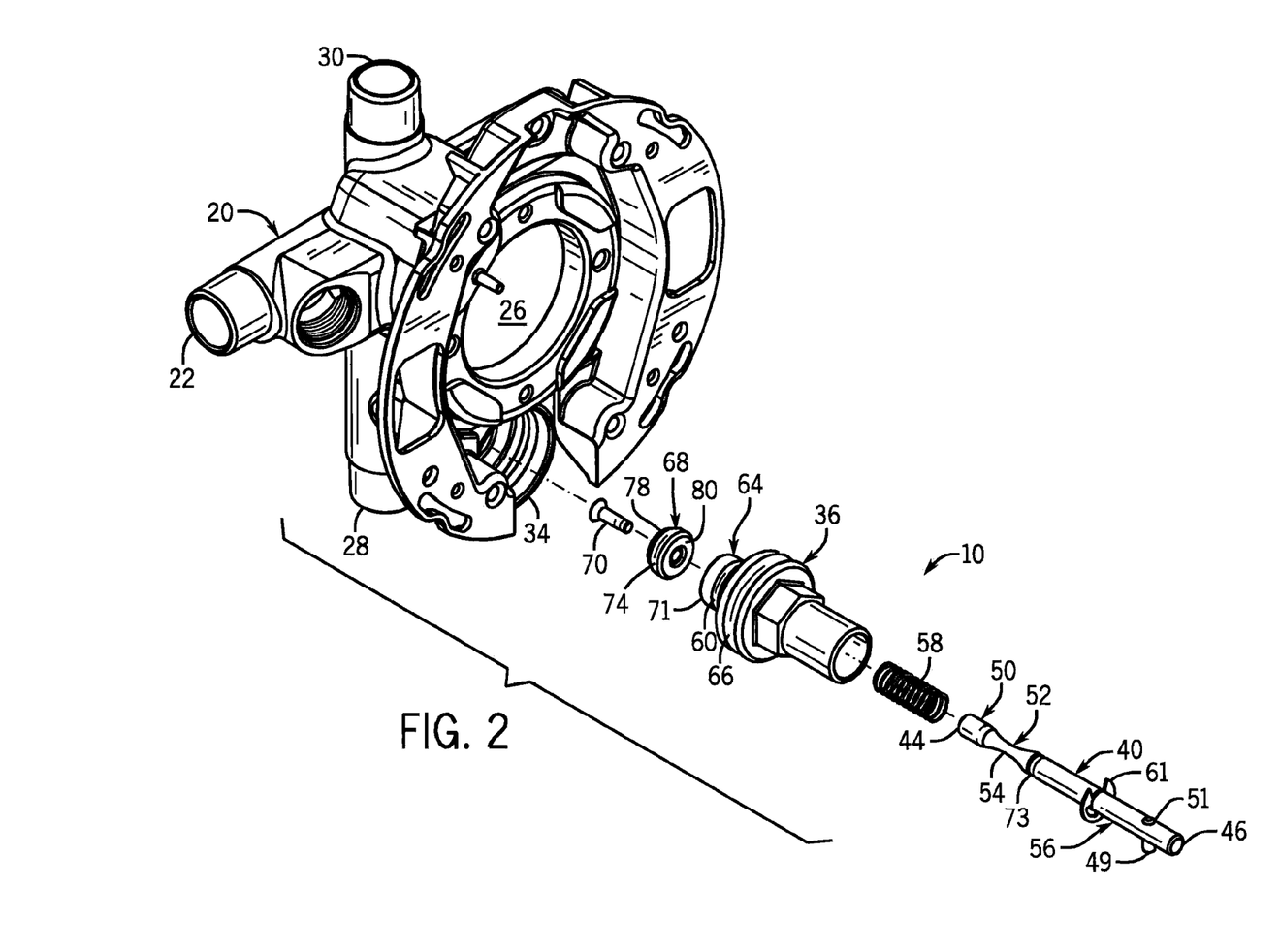
Figure 3:
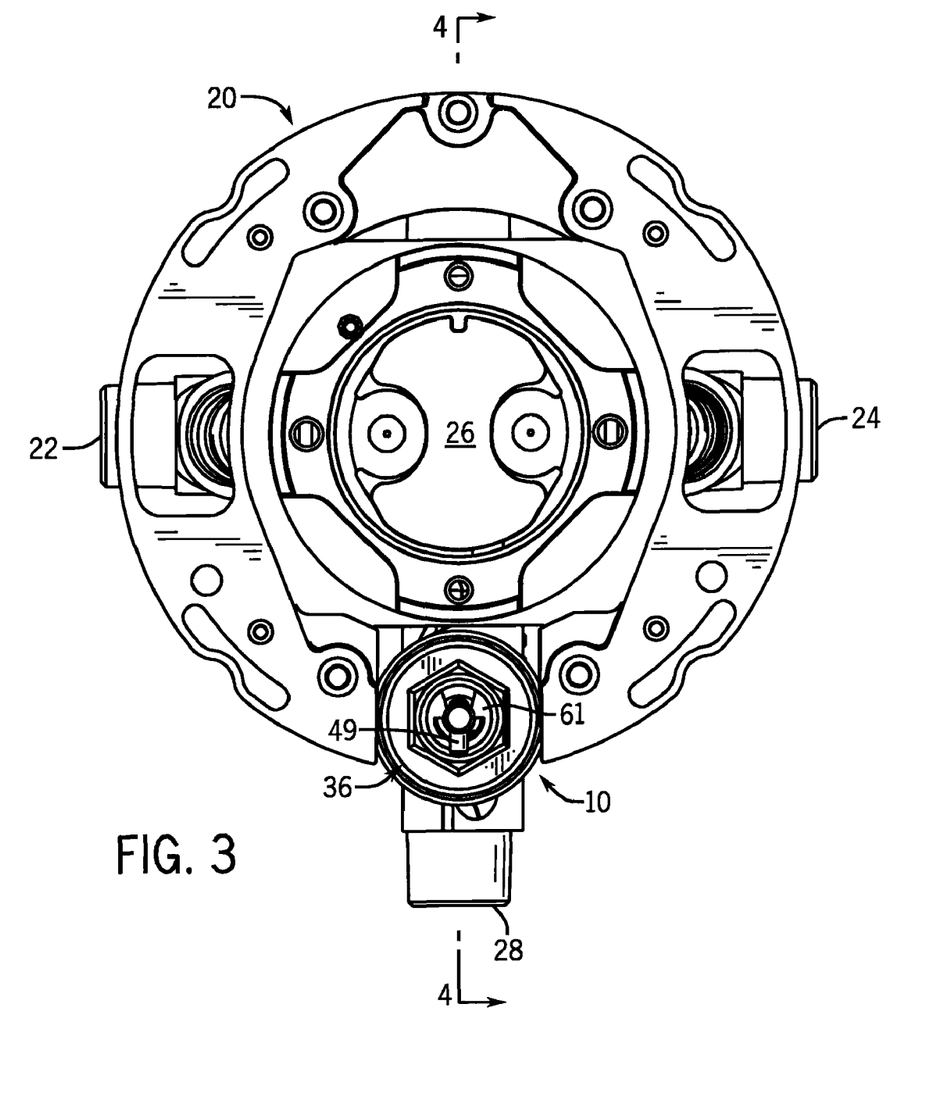
FIG. 3 is a frontal view of the FIG. 2 assembly, but with the diverter valve not exploded from the rear housing.

Importantly, the diverter stem 40 also has an narrowed portion 50 proximate the upstream end 44. Thus, a reduced portion 52 of the diverter stem 40 is downstream of the upstream portion 50 and tapers from the upstream portion 50 toward a waist 54, and then flares from the waist 54 toward a portion 56 located downstream. The taper and the flare of the reduced portion 52 may be gradual or more abrupt, and may take on a variety of forms.

It is the main purpose of this structure to help reduce the activation force "F" required to move the diverter stem 40 between the non-diverted and diverted positions. Of course, it should be appreciated that instead of tapering, a similar functional effect may be achieved using stepped narrowing. Also, the narrowing need not be symmetrical around the circumference of the stem.

In any event, there is a spring or other biasing member 58 which tends to bias the diverter towards the tub filling position of FIG. 4. It is captured between a shoulder 59 of the diverter body 36 and a removable c-clip 61.

In the non-diverted tub filling position (shown in FIG. 4), the supply port 38 of the example embodiment is in fluid communication with the tub fixture port 28, and the water is prevented from flowing along the diverter stem 40 (to reach showerhead port 30). The seal 60 (e.g. an o-ring) is fit into an annular groove 62 formed in a portion 64 of the diverter body.

At this time stem seal 67 fits into an annular groove 69 formed proximate an upstream end 71 of the diverter body 36. It helps seal against the upstream portion 50 of the diverter stem 40 when the diverter stem 40 is in the non-diverted position.

There is also another stem seal 73 seated in an annular groove 75 formed in the downstream portion 56 of the diverter stem 40. The second stem seal 73 engages the axial passageway 42 and prohibits fluid from leaking past the diverter stem 40 via the axial passageway 42. The seals and components used in the example embodiment are generally configured and designed to operate at typical line pressures.

Note also that there is a cap 68 captured at the upstream end 44 of the diverter stem 40 by a fastener 70 (e.g., a bolt). The cap 68 helps define the groove 72 that receives a seal 74 (e.g., an o-ring). The seal 74 generally engages the interior surface 76 of the chamber 32 and establishes a moveable sealing interface that is slidable within the chamber 32 as the diverter stem 40 is moved between the non-diverted position (shown in FIG. 4) and the diverted position (shown in FIG. 6). The member 68 of the preferred example embodiment includes a generally domed upstream surface 78 and a generally disc-shaped downstream surface 80.

The position of this seal 74 is particularly important as when it is positioned as shown in FIG. 6 water can pass along the stem 40 to reach the outlet 30. However, when it is positioned as shown in FIG. 4, water is blocked from the downstream end of the stem.

In operation a bather rotates the control handle 16 to allow hot and cold water to flow into the mixing cavity 26 via the hot port 22 and cold port 24, respectively. The resulting mixed water then flows from the mixing cavity 26 toward the supply port 38. With the diverter stem 40 in the most typical, non-diverted position, the water flows through the chamber 32 and into the tub fixture port 28, ultimately flowing out of the tub filler/fixture (not shown).

The bather may then apply an activation force F to the diverter assembly 10 to push the diverter stem 40 toward the diverted position (shown in FIG. 6). The pushing force F must be enough to overcome the spring biasing, the water line pressure, and initial friction.

Figure 5:
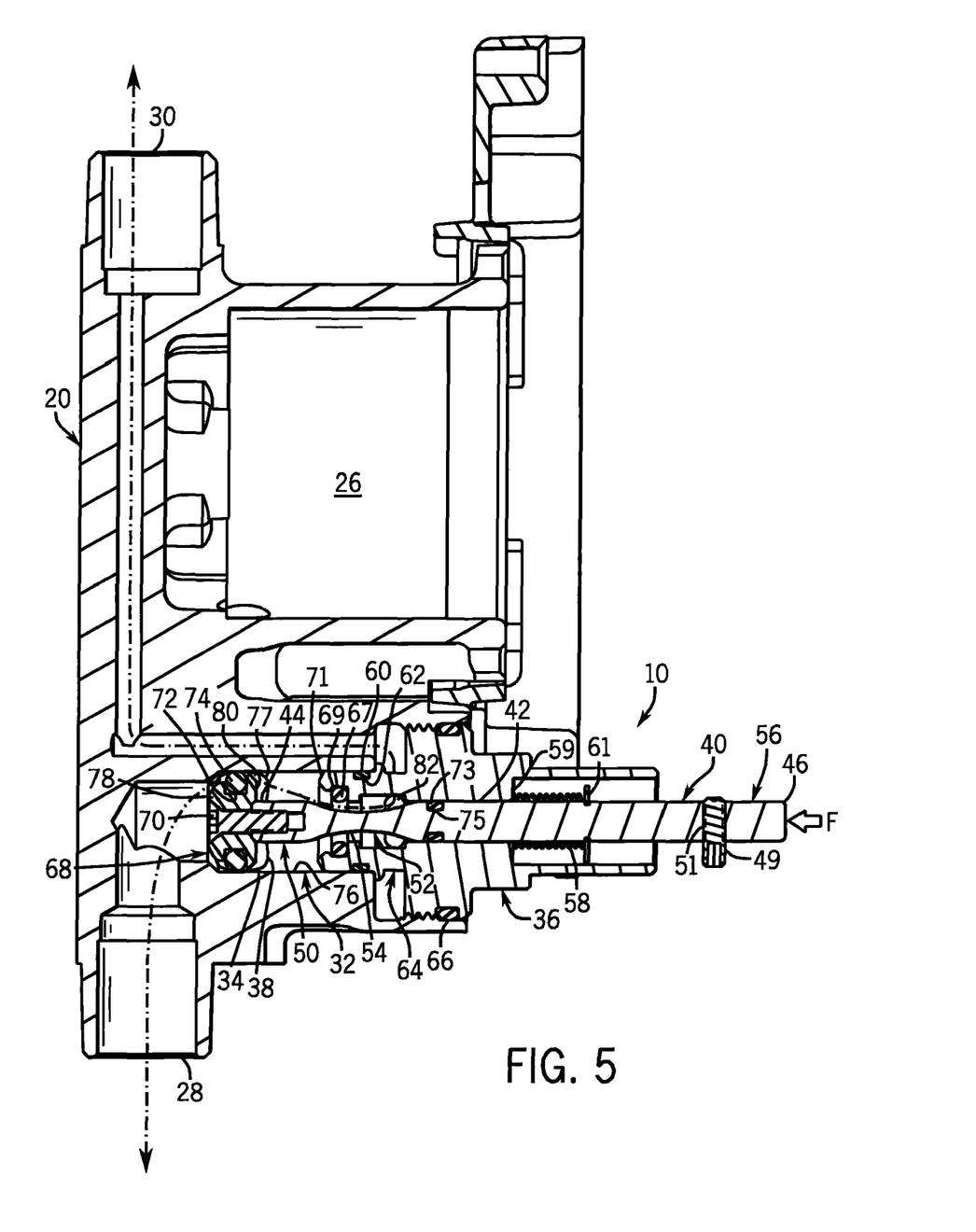
FIG. 5 is a view similar to FIG. 4, but showing the diverter valve in an intermediate position as it begins to divert.

Turning next to FIG. 5, the diverter stem 40 is shown in an intermediate position whereat the seal 74 of the member 68 has moved upstream past the right edge 77 of the supply port 38 (as viewed in FIG. 5). In this position, water begins to flow along the stem.

However, the reduced section 52 quickly reduces pushing resistance attributable to water pressure. In fact the water establishes an overall pressure gradient adjacent the diverter stem 40 that itself helps urge the diverter stem 40 toward the diverted position. Thus, the activation force F required to be provided by the bather is reduced in two ways. The water not only quickly stops pushing the stem to the right during diversion, it also helps drag it to the left.

As the diverter stem 40 moves more and more to the left, an increasing amount of water is directed downstream along the reduced portion 52 toward the shower fixture port 30. The water flows along the reduced portion 52 and into an outlet port 82 formed in the diverter body 36. The outlet port 82 is positioned proximate nipple portion 64 and the reduced portion 52 of the diverter stem 40. As a result, a sufficient amount of water is directed downstream along the diverter stem 40 and toward the shower fixture port 30.

With specific reference to FIG. 6, the diverter stem 40 is shown moved into the diverted position where force provided by the water (e.g. the static and dynamic pressure components), as well as friction, maintain the diverter stem 40 in the diverted position without the application of any further external force.

If the flow of water through the control valve 14 is reduced below a critical value (e.g. the valve 12 is turned off), spring 58 can then return the diverter stem 40 to the non-diverted position. As a result, the next time the bather operates the tub/shower plumbing fixture, the water will again initially flow through the tub filler port 28.

A preferred example embodiment of the present invention has been described above. It should be appreciated that many modifications and variations to it can be made without departing from the spirit of the invention.

For example, the diverter assembly 10 can be used with a valve having three or more outlets, with additional positions being supplied along the diverter to accommodate that. Further, the diverter need not be used with a mixing valve. Rather, a single supply of water or other fluid could be diverted between multiple outlets using the principles of the present invention.

Therefore, the invention should not be limited to the preferred example embodiment described. Rather, the claims should be looked to in order to judge the full scope of the invention.

INDUSTRIAL APPLICABILITY

The invention provides fluid diverters for manipulating the path of fluid through the diverter, particularly allowing for a reduced actuation force.

What is claimed is:

1. A diverter valve, comprising:
a housing having an internal chamber;
a supply port in fluid communication with the internal chamber and coupleable to a fluid supply;
a first outlet;
a second outlet;
a seal coupled to the housing between the supply port and the second outlet; and
a stem moveable within the chamber between a first position at which the stem permits fluid communication between the supply port and the first outlet while inhibiting fluid communication between the supply port and the second outlet, and a second position at which the stem permits fluid communication between the supply port and the second outlet while inhibiting fluid communication between the supply port and the first outlet;
wherein the stem includes an upstream portion, a downstream portion, and a reduced portion located between the upstream and downstream portions, the reduced portion having a reduced cross sectional area relative to the upstream portion of the stem, the stem being configured and positioned such that the reduced cross sectional area helps reduce the activation force needed to move the stem from the first position to the second position;
wherein the housing also houses a mixing valve; and
wherein when the stem is in the first position, the seal is proximate the upstream portion, and when the stem is in the second position, the seal is proximate the reduced portion.

2. The diverter valve of claim 1, wherein the mixing valve is suitable to control both temperature and volume.

3. The diverter valve of claim 1, wherein the upstream portion is essentially cylindrical.

4. The diverter valve of claim 1, wherein the stem further comprises a second seal coupled to the upstream portion.

5. The diverter valve of claim 1, further comprising a biasing member urging the stem towards the first position.

6. The diverter valve of claim 5, wherein the biasing member is a compression spring.

7. The diverter valve of claim 6, wherein a stop member is provided to help capture the compression spring.

8. The diverter valve of claim 1, wherein the reduced portion of the stem tapers radially inwardly from the upstream portion towards a waist and wherein the stem also flares radially outwardly from the waist towards the downstream portion.

9. The diverter valve of claim 1, wherein the housing comprises a passageway extending from the chamber to the second outlet and configured to slidably receive the stem, and wherein the seal is located in the passageway.

10. The diverter valve of claim 9 further comprising a body coupled to the housing, the body defining the passageway extending from the chamber to the second outlet.

11. A diverter valve coupleable to a fluid supply to selectively direct a fluid between two outlets, comprising:
a housing having an internal a cylindrical chamber;
a supply port in fluid communication with the chamber and coupleable to the fluid supply;
a first outlet;
a second outlet;
a seal coupled to the housing between the supply port and the second outlet; and
a generally cylindrical diverter stem moveable within the chamber between a nondiverted position at which the diverter stem inhibits fluid communication between the supply port and the second outlet, and a diverted position at which the diverter stem permits fluid communication between the supply port and the second outlet;
wherein the diverter stem has an upstream portion, a downstream portion, and a reduced cross sectional waist between the upstream and downstream portions;
wherein the reduced cross sectional area waist tapers radially inwardly from the upstream portion and flares radially outwardly towards the downstream portion;
wherein when the diverter stem is in the nondiverted position, the seal seals against the upstream portion of the diverter stem, and when the diverter stem moves from the nondiverted position to the diverted position, the reduced cross sectional area waist passes at least partially through the seal; and
wherein the housing also houses a mixing valve.

12. The diverter valve of claim 11, wherein the reduced cross sectional area is defined by a concave surface that defines the taper and flare.

13. A diverter valve, comprising:
a housing having an internal chamber and an outlet port;
a supply port in fluid communication with the internal chamber and coupleable to a fluid supply;
a first outlet;
a second outlet that is in fluid communication with the outlet port; and a stem moveable within the chamber between a first position at which the stem permits fluid communication between the supply port and the first outlet while inhibiting fluid communication between the supply port and the outlet port, and a second position at which the stem permits fluid communication between the supply port and the outlet port while inhibiting fluid communication between the supply port and the first outlet;

wherein the stem includes a downstream portion that has a reduced cross sectional area relative to an essentially cylindrical upstream portion of the stem, the stem being configured and positioned such that the reduced cross sectional area helps reduce the activation force needed to move the stem from the first position to the second position;

wherein the stem includes a cap proximate an upstream end of the diverter stem and configured to receive a seal;

wherein the upstream portion of the stem is narrower than the cap; and wherein the reduced cross sectional area is defined by a concave surface.

14. The diverter valve of claim 13, wherein the concave surface includes a taper portion and a flare portion.

15. The diverter valve of claim 14, wherein the flare portion is located proximate the outlet port when the stem is in the second position to help reduce the activation force needed to move the stem from the first position to the second position.

16. The diverter valve of claim 13, wherein the stem further includes a cylindrical portion that is downstream from the concave surface, the cylindrical portion having a diameter that is substantially similar to the diameter of the upstream portion.

17. The diverter valve of claim 16, wherein the cylindrical portion includes an annular undercut groove.

18. The diverter valve of claim 17, wherein the groove of the cylindrical portion receives a seal to prohibit leaking of fluid past the stem.

19. The diverter valve of claim 13, wherein the housing also houses a mixing valve.

20. The diverter valve of claim 13, wherein the cap is coupled to the stem.

* * * * *

UNITED STATES PATENT AND TRADEMARK OFFICE
CERTIFICATE OF CORRECTION

Page 1 of 1

PATENT NO.      : 8,312,897 B2
APPLICATION NO. : 12/335564
DATED           : November 20, 2012
INVENTOR(S)     : Niver

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 512 days.

Signed and Sealed this
Twenty-first Day of April, 2015

Michelle K. Lee
*Director of the United States Patent and Trademark Office*